United States Patent
Schorsch

(10) Patent No.: US 8,484,562 B2
(45) Date of Patent: Jul. 9, 2013

(54) DYNAMIC TEXT ADJUSTMENT IN A USER INTERFACE ELEMENT

(75) Inventor: Brent Schorsch, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 175 days.

(21) Appl. No.: 12/823,908

(22) Filed: Jun. 25, 2010

(65) Prior Publication Data

US 2011/0320938 A1 Dec. 29, 2011

(51) Int. Cl.
*G09G 5/00* (2006.01)

(52) U.S. Cl.
USPC ........... 715/269; 715/270; 715/272; 715/815; 345/629

(58) Field of Classification Search
USPC .......................... 715/269, 273, 270, 272, 815
See application file for complete search history.

(56) References Cited

U.S. PATENT DOCUMENTS

| | | | |
|---|---|---|---|
| 5,784,487 A | 7/1998 | Cooperman | |
| 6,456,305 B1 * | 9/2002 | Qureshi et al. | 715/800 |
| 7,385,606 B2 * | 6/2008 | Everett et al. | 345/467 |
| 7,430,712 B2 | 9/2008 | Arokiaswamy | |
| 8,031,972 B2 * | 10/2011 | Bhakta et al. | 382/298 |
| 8,171,401 B2 * | 5/2012 | Sun | 715/252 |
| 2003/0028560 A1 * | 2/2003 | Kudrolli et al. | 707/509 |
| 2003/0048294 A1 | 3/2003 | Arnold | |
| 2004/0119714 A1 * | 6/2004 | Everett et al. | 345/471 |
| 2004/0123243 A1 * | 6/2004 | Everett | 715/517 |
| 2007/0013719 A1 * | 1/2007 | Yamamoto | 345/629 |
| 2008/0168388 A1 | 7/2008 | Decker | |
| 2009/0307576 A1 * | 12/2009 | Thomson et al. | 715/221 |
| 2011/0175917 A1 * | 7/2011 | Honda et al. | 345/468 |

* cited by examiner

*Primary Examiner* — Cesar Paula
*Assistant Examiner* — Mohammed-Ibrahim Zuberi
(74) *Attorney, Agent, or Firm* — Wong, Cabello, Lutsch, Rutherford & Brucculeri, LLP

(57) ABSTRACT

This is directed to efficiently identifying alternative display attributes for displaying text in a display region when default display attributes are inadequate for displaying the text. Many electronic device user interfaces are designed based on text in a default language. When interfaces are translated for use in other languages, the translated interfaces can include words or phrases that are longer than the corresponding text in the initial language. To quickly find an adequate, alternate display attribute for the longer text (e.g., a new font size), the electronic device can calculate assumed reduced text box sizes for displaying the text should display attributes of the text be reduced. The electronic device can select an adequate reduced text box, and reduce the display attributes by an amount corresponding to the reduced text box.

18 Claims, 9 Drawing Sheets

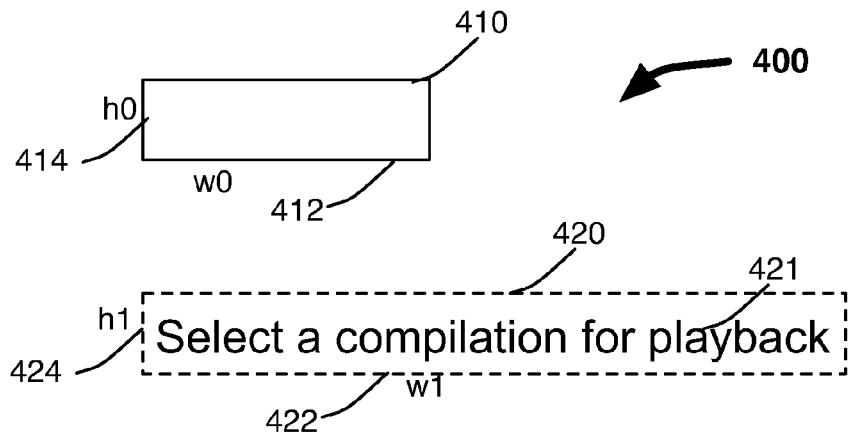
FIG. 4
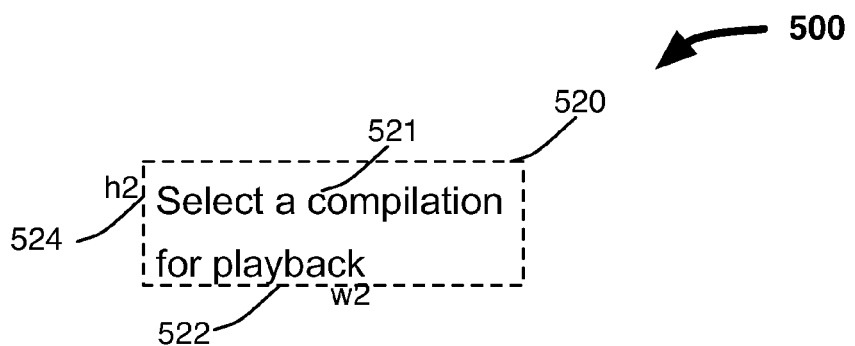
FIG. 5
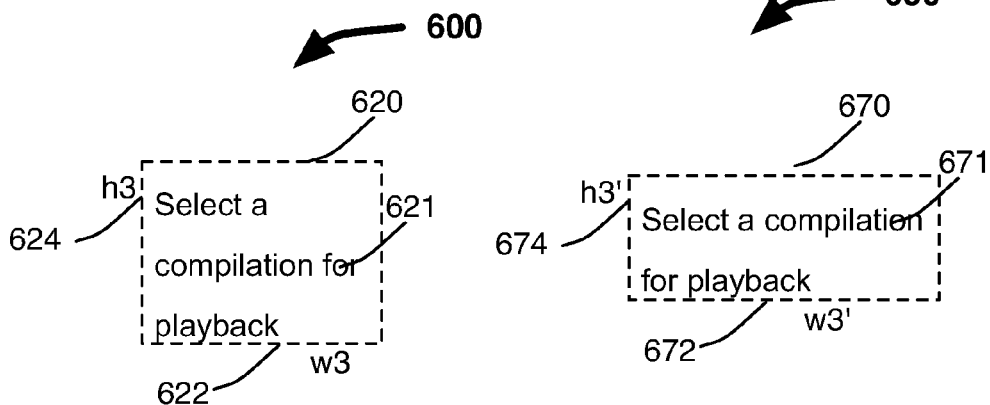
FIG. 6A     FIG. 6B

| | h0/h | w0/w | min |
|---|---|---|---|
| h1/w1 | 100% | 51% | 51% |
| h2/w2 | 78% | 85% | 78% |
| h3/w3 | 56% | 95% | 56% |
| ... | ... | ... | ... |

FIG. 7

DYNAMIC TEXT ADJUSTMENT IN A USER INTERFACE ELEMENT

BACKGROUND

Many electronic devices include one or more displays on which information can be provided to a user. For example, graphics, images, videos, text, glyphs, or other content can be provided on a display. The content can be disposed on the display in any suitable manner including, for example, as distinct, non-overlapping content, or as content disposed on different overlapping layers. Content can be provided from any suitable source including, for example, from an application provided on the electronic device, an operating system, firmware, or any other source for providing content to display. In some cases, a single source can provide several instances of content including, for example, instances of overlapping content (e.g., text in a drawn text box).

Content provided for display can be formatted using different approaches. In some cases, an application can define, for the content provided by the application, a manner in which different instances of content are to be displayed. Similarly, other sources of content (e.g., an operating system or firmware) can direct a manner in which particular instances of content provided by an application are to be displayed. When text is displayed in a particular region of a display, attributes corresponding to the particular text and to the particular region can be selected. For example, a particular font type and font size can be selected based on the size of the region, or on a characteristic of the region within a given displayed user interface (e.g., a level within a hierarchical menu).

To ensure that the displayed text is displayed properly, attributes defining the manner in which the text is to be displayed can be selected so that the text fits properly within a display region. In some cases, particular font types and font sizes can be selected so that text fits in the display region in a manner that maximizes the available display region. For example, font types and sizes can be selected such that an entire text string fills a single line of a region, and the single line extends across the entirety of the display region. As another example, a text string can be displayed such that the string extends, on two or more lines, across the entirety of the display region. In some embodiments, default attributes can instead or in addition be used for particular text.

The display attributes specifying the manner in which text is displayed can be provided using different approaches. For text provided by an application or an operating system, a programmer can code pre-established display attributes to associate with each instance of text. Other text, however, may instead be provided by a user, or identified from data stored on the device by a user, and may not be known to a programmer of an application or an operating system. For such text, the electronic device may be required to select attributes for displaying the text strings. While default attributes can be selected, this approach may not account for the size of a display region or for the amount of text to display, and may therefore cause the device to display text in a manner that is not aesthetically pleasing, or in a manner that detracts from a desired user experience.

Furthermore, some user interfaces can be designed for text in a particular language. In particular, display attributes, as well as display region sizes, can be selected based on known or expected text in a given language. If an end user wishes to use a different language, however, the text displayed may differ (e.g., the text can have a different length or include space between words at different positions within the text). In some languages, the text can be so different that simply using the display attributes associated with the corresponding text in the initial language can lead to a user interface that is not aesthetically pleasing (e.g., text in German may include longer words that do not fit in a display region when attributes corresponding to an English equivalent with shorter words are used).

SUMMARY

This is directed to dynamically adjusting attributes that can affect the manner in which text is displayed by an electronic device. In particular, this is directed to comparing a display region size with a text size, and sequentially modifying the dimensions of a text box to which display attributes correspond until suitable attributes are identified. This may be particularly useful when displaying text in a language other than one for which a user interface was designed.

In some embodiments, an electronic device can determine a font size for text to display so that the text fits naturally in a display region ("naturally," in accordance with some embodiments, generally means that the text fits within the display region such that it does not appear compressed or squeezed within the region). The electronic device can detect a height and a width of the display region, and determine a corresponding height and a corresponding width of an initial text region defining a minimum region required for displaying the text using a default font size. The electronic device can define several adjusted text regions each having a height and a width. The height of each adjusted text region can correspond to a different number of lines of text within the adjusted text region, and the width of each adjusted text region can correspond to the width of the initial text region reduced by a reduction amount corresponding to the number of lines within the adjusted text region. The electronic device can identify, for each adjusted text region, the smaller of the ratio of the height of the display region over the height of the text region and the ratio of the width of the display region over the width of the text region. The electronic device can then identify the particular adjusted text region having the largest of the identified smaller ratios, and display the text in the display region using a reduced font size corresponding to the default font size reduced by the reduction amount of the particular adjusted text region.

In some embodiments, an electronic device can determine a display attribute for displaying text in a display region. The electronic device can receive text to display from a content source, identify a display region in which to display the text using default display attributes, and determine if the text does not fit within the identified display region. The electronic device can then define an initial characteristic dimension corresponding to a smallest region in which the text can fit in one line using the default display attributes, and define at least one subsequent characteristic dimension equal to the initial characteristic dimension reduced by a function of a reduction amount and a number of lines over which to wrap the text. The electronic device can identify the subsequent characteristic dimension having a largest value for an attribute function applied to the subsequent characteristic dimension, and retrieve display attributes corresponding to the identified subsequent characteristic dimension. The electronic device can then display the text in the display region using the retrieved display attributes.

In some embodiments, an electronic device can select display attributes for text displayed in a display region. The electronic device can detect a characteristic dimension of the display region. The electronic device can also define a first text box in which text is displayed on one line, where the first text box is characterized by a first characteristic dimension, a second text box in which text is displayed on two lines, where the text box is characterized by a second characteristic dimension equal to the first characteristic dimension reduced by a reduction amount, and a third text box in which text is displayed on three lines, where the third text box is characterized by a third characteristic dimension equal to the second characteristic dimension reduced by the reduction amount. The electronic device can identify the largest ratio of the characteristic dimension of the display region over each of the first, second and third characteristic dimensions, and can display, in the display region, the text using display attributes associated with the text box having the characteristic dimension yielding the largest ratio.

BRIEF DESCRIPTION OF THE DRAWINGS

The above and other features of the present invention, its nature and various advantages will be more apparent upon consideration of the following detailed description, taken in conjunction with the accompanying drawings in which:

FIG. 4 is a schematic view of an illustrative display region in which text is to be displayed in accordance with one embodiment of the invention;

FIG. 5 is a schematic view of text having different display attributes for display in a display region in accordance with one embodiment of the invention;

FIG. 6A is a schematic view of text having different display attributes for display in a display region in accordance with one embodiment of the invention;

FIG. 6B is a schematic view of text having different display attributes for display in a display region in accordance with one embodiment of the invention;

FIG. 7 is a table illustrating a variation in text region ratios in accordance with one embodiment of the invention;

DETAILED DESCRIPTION

An electronic device can display different content to a user. In particular, an electronic device can display textual content as part of an application, operating system, firmware, or other code operating on an electronic device.

Figure 1:
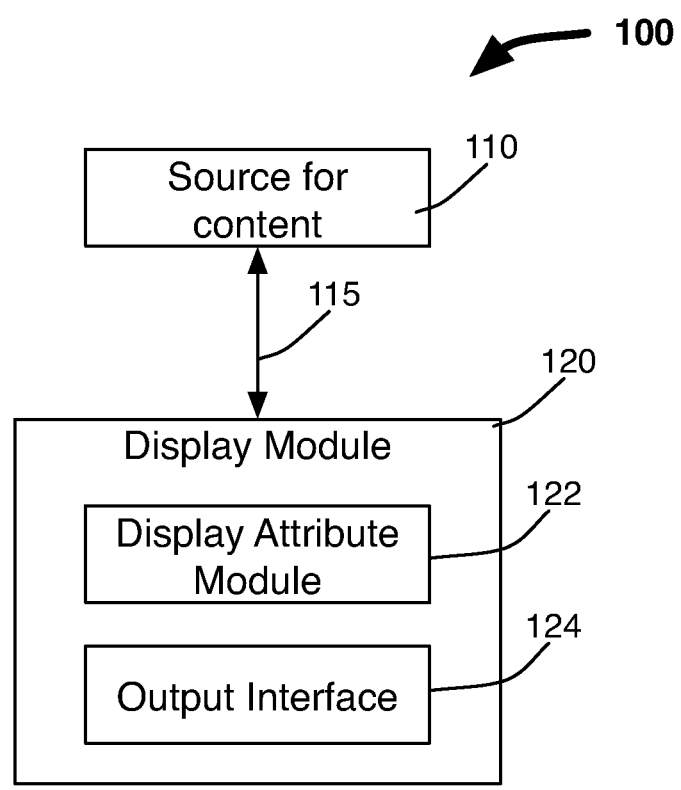
FIG. 1 is a schematic view of an illustrative system for displaying text in accordance with one embodiment of the invention.

FIG. 1 is a schematic view of an illustrative system for displaying text in accordance with one embodiment of the invention. System 100 can be integrated in any suitable electronic device or combination of electronic devices. For example, system 100 can be incorporated in a single electronic device. As another example, different features or functionality of system 100 can be distributed or replicated between several electronic devices (e.g., devices or components connected by a communications path). System 100 can include source 110 for content to be displayed. Source 110 can provide any suitable type of content for display by a device including, for example, content or information corresponding to an application operating on the device, a system task, an operating system, firmware, or other code or software defining a manner in which the device operates. The content can be provided in any suitable form including, for example, images, video, text, or other higher-level information, such as glyphs or other combinations of pixels, or other forms. In some embodiments, the content can include text or other particular information.

Any suitable source 110 can provide content for display by a device. For example, source 110 can include one or more applications operating on the device, where the applications provide content with which a user can interact. The content can be provided as one or more display elements forming a user interface. As another example, source 110 can include an operating system that provides a platform on which applications can run, and an interface for interacting with applications. Each source can provide content using any suitable approach including, for example, in the manners described above.

Source 110 can provide content to display module 120 for display by the electronic device over communications path 115. Communications path 115 can include any wired or wireless path by which instructions or content can be transferred between source 110 and display module 120. For example, communications path 115 can include wire(s), flex circuitry, conductive trace(s), or other physical paths by which an electrical signal can be transmitted. As another example, communications path 115 can include a wireless path. The wireless communications path can support any suitable communications protocol, or any suitable type of communications network including, for example, Wi-Fi (e.g., a 802.11 protocol), Bluetooth™ (which is a trademark owned by Bluetooth Sig, Inc.), radio frequency systems, cellular networks, infrared, or combinations of these.

Upon receiving content to display from source 110, display module 120 can provide the received content to display attribute module 122. Display attribute module 122 can configure a layout for content received from source 110, and establish particular attributes for items of content received from source 110. For example, display attribute module 122 can retrieve or define particular regions of a display in which content is to be provided, and define attributes of the content that define the manner in which the content is displayed to ensure that the content is properly presented within the allocated region. When the content includes text, display attribute module 122 can define a font type, font size, spacing, orientation, alignment, or other attributes of displayed text.

In some embodiments, the display attribute module can apply a word wrap process to display text in a display region. Display attribute module 122 can provide display instructions directing output interface 124 to provide a visual output corresponding to the content provided by source 110 formatted by display attribute module 122.

In response to receiving a user instruction, or as an application operates, the particular content provided by display module 120 can change. Source 110 can then provide new content to display module 120, where display attributes of the new content can be defined to enable output interface 124 to display the new content.

Figure 2:
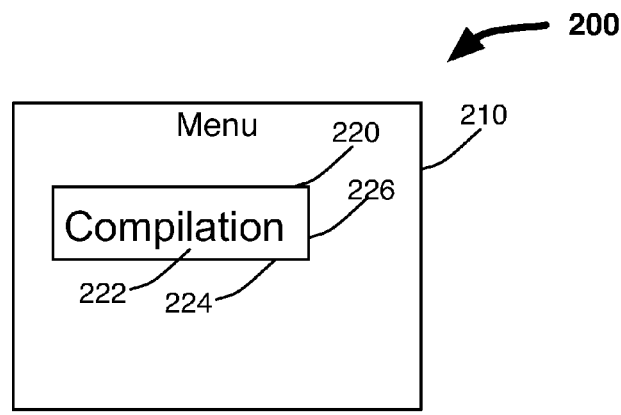
FIG. 2 is a schematic view of an illustrative electronic device display of text in accordance with one embodiment of the invention.

FIG. 2 is a schematic view of an illustrative electronic device display of text in accordance with one embodiment of the invention. Display 200 can be provided by a device in response to receiving content from any suitable source including, for example, an application or operating system. Display 200 can include region 210 in which content can be provided. Region 210 can have any suitable disposition within display 200. For example, region 210 can be limited by a display size (e.g., the physical size of display circuitry). As another example, region 210 can correspond to an application window. Within region 210, display 200 can include text box 220 in which text can be provided. Boundaries of text box 220 can be displayed by the device, or can instead or in addition be hidden from view. The boundaries of text box 220 can serve to determine how much of a text element can be displayed at a single instance in time within text box 220. Text box 220 can have any suitable characteristic dimension including, for example, dimensions defined by box width 224 and box height 226.

To ensure that display 200 is aesthetically pleasing and enhances a user's experience, display attributes of the particular text 222 placed in text box 220 that define the manner in which the text is displayed can be selected based on the dimensions and position of text box 220 within display 200. For example, a font type, font size, character spacing, and word alignment can be selected so that a particular selection of text substantially fills the text box. In particular, a programmer or other designer of the display can select, for known text 222 (e.g., menu items in a particular language, such as English), display attributes for the text in the text box. Alternatively, a program or other designer of the display can define the size of text box 220 based on desired display attributes for text 222. Text 222 can include one or more words, phrases, or sentences. For example, text 222 can include a single or multi-word instruction or information that can be displayed in one or more lines within text box 220.

In some cases, however, a user may wish to display particular text in a text box, where the particular text displayed is different than the text that was used to define one or both of the text box size and the display attributes for the text. For example, a user may wish to display text from application menus in a language other than the one used to design the display (e.g., display menus in German rather than in English). The particular text displayed can differ from the initial text in any suitable manner including, for example, in the length of the text. For example, the English word "compilation" can be translated to the German word "Zusammenstellung," which has 5 more characters. When the different text is displayed in a text box using display attributes corresponding to the initial text (e.g., same font type and font size), the resulting display may detract from the user's experience. In particular, the German word "Zusammenstellung" may not fit within the text box designed for the English word "compilation."

Figures 3A, 3B:
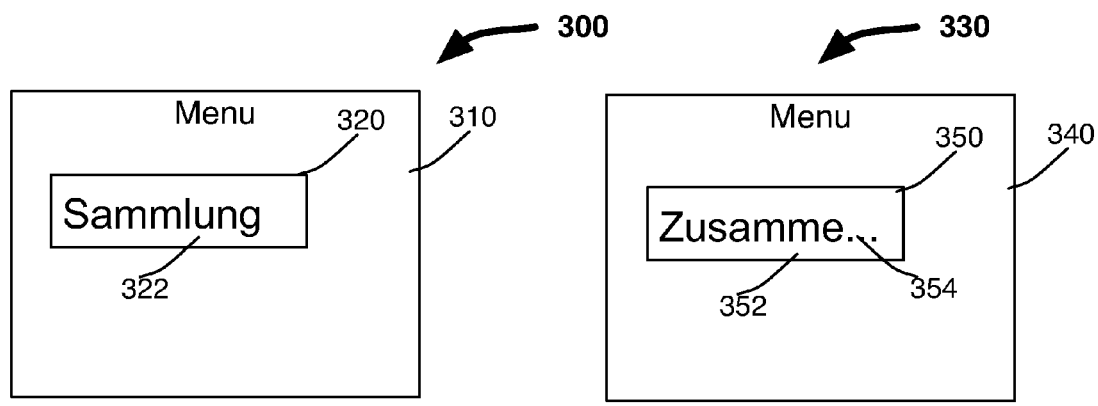
FIGS. 3A-3C are schematic views of alternative approaches for displaying alternate text in a text box in accordance with some embodiments of the invention.
Figure 3C:
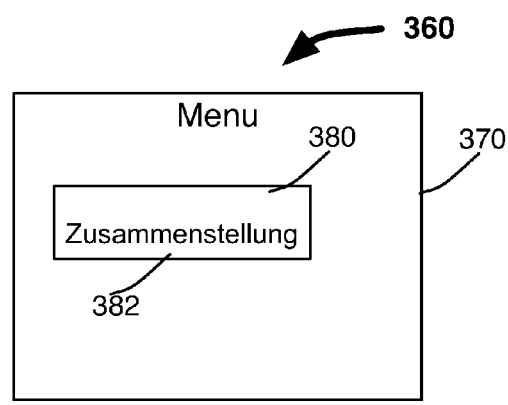

Different approaches can be used to display an alternate text in a pre-defined text box in a manner that does not detract from the user's experience. FIGS. 3A-3C are schematic views of alternative approaches for displaying alternate text in a text box in accordance with some embodiments of the invention. In some embodiments, one or more of the approaches described below can be combined for a particular display. Display 300, shown in FIG. 3A, can include region 310 and text box 320 having some or all of the properties of the corresponding elements of FIG. 2. Text box 320 can have the same size as text box 220 (e.g., as defined as part of the user interface), but the text 322 placed in text box 320 can differ from text 222 (FIG. 2). To ensure that the new text can be provided in text box 320 in an appropriate manner (e.g., the new text is displayed in a natural manner), the particular text can be selected to have a same or smaller length than the initial text for which text box 320 was designed. In particular, if the text is a translation of the initial text, a translation can be selected based on the length of the translated word. For example, instead of using a more accurate term, "Zusammenstellung," the electronic device can use the shorter term "Sammlung," which fits in text box 320 using the same display attributes used for text 222.

In some cases, however, it may be desirable to use an accurate translation, or there may be no alternatives to longer text. Display 330, shown in FIG. 3B, can include region 340 and text box 350 having some or all of the properties of the corresponding elements of FIG. 2. To display text 352 in text box 350 while using the same display attributes used for text 222 (e.g., to ensure a consistent appearance in different text boxes of a display), text 352 can be truncated, as indicated by ellipsis 354. Text 352 can be truncated at any suitable location including, for example, based on syllables of the text, the maximum number of characters that can be displayed in the text box, or combinations of these. In some embodiments, text 352 can scroll or marquee within text box 350 so that a user can read the entirety of the text.

In other cases, it may be desirable to change the manner in which text is displayed within a text box, instead of changing the text itself or the amount of text that can be displayed. Display 360, shown in FIG. 3C, can include region 370 and text box 380 having some or all of the properties of the corresponding elements of FIG. 2. To ensure that the entirety of text 382 (e.g., "Zusammenstellung") is visible within text box 382, the display attributes selected for text 382 can differ from those selected for text 222. In particular, while the font type can remain the same for consistency, the font size may be smaller. For example, text 222 can be displayed using a size 19 font, but text 382 can be displayed using a size 12.5 font. The particular font size, or other display attributes selected for text 382 can be selected using any suitable approach including, for example, by using pre-defined secondary display attributes, or by stepping through and comparing a sequence of display attributes. In one implementation, the electronic device can step through and re-wrap text 382 for each font size smaller than the initial font size of text 222, and select the font size that maximizes the display of text 382. This approach, however, may be inefficient and require significant power and processing resources.

It may be desirable, therefore, to define a process by which an electronic device can quickly and efficiently adjust display attributes of text to match a text box or other region of a display in which the text is to be displayed. Although the following example will be shown in the context of a multi-word text string written in English, it will be understood that the process used by the electronic device can be applied to any text to be displayed including, for example, non-English text or text written in alphabets other than the Latin alphabet. FIG. 4 is a schematic view of an illustrative display region in which text is to be displayed in accordance with one embodiment of the invention. Display region 410 can be incorporated on any suitable portion of a display, for example as part of a user interface (e.g., provided by an application). Display region 410 can have any suitable size relative to the device display including, for example, a size corresponding to a relatively small region, substantially the entirety of the display, or a range between the two. Display region 410 can be characterized by any suitable dimension including, for example, width 412 (w0) and height 414 (h0). If display region 410 is not substantially rectangular, other characteristic measurements can be used to determine the size of the display region (e.g., diameter of a circle, or axes of an ellipse). Dimension 412 and 414 can be provided in any suitable unit of measurement including, for example, number of pixels, length (e.g., in mm) at a particular zoom level, percentage of available display (e.g., of an application display or of the device display), or combinations of these.

To determine how to display text within display region 410, the electronic device can determine characteristic dimensions of a display area required to display the text, should the text be displayed in a single line using default or standard display attributes. For example, the electronic device can virtually display the text using display attributes corresponding to the original text used to design the interface (e.g., the display attributes used to define the size of display region 410). In particular, the electronic device can apply default display attributes to text 421 such that the device can define text region 420 as the smallest possible text region in which text 421 can be displayed in a single line using the default display attributes (e.g., default font type and font size). Text region 420 can be characterized by width 422 (w1) and height 424 (h1).

Initially, the electronic device can compare the characteristic measurements of display region 410 and text region 420. If text region 420 fits within display region 410 (e.g., if h0>h1 and w0>w1), text 421 can be displayed in the display region using the default display attributes. In some embodiments, the electronic device can instead only determine whether the width of the text region fits within the width of the display region (e.g., whether w0>w1). If text region 420 instead does not fit within display region 410 (e.g., if h0<h1 or w0<w1, or only w0<w1), the display attributes of text 421 may be modified. Although the following discussion will describe modifying display attributes by changing the font size used for the text, it will be understood that any other modification of one or more display attributes can be provided.

In this process, the electronic device can assume that to decrease a characteristic measurement of a text region (e.g., to decrease the space required for text) by a particular amount (e.g., x %), the font size may need to be decreased by the same particular amount (e.g., x %). In other words, a direct correlation can be assumed between text region dimensions and a font size for text placed in the text region. In response to detecting that text region 420 does not fit within display region 410, the electronic device can determine that the text region may need to be reduced by a particular amount, for example characterized as x %. The electronic device can determine the amount by which to decrease the text region using any suitable approach. In some embodiments, a reduction amount can be selected based on an analysis of optimal display attributes applied to different text strings for different display regions (e.g., calculate optimal display attributes for a subset of text strings and display regions in some languages). Alternatively, a reduction amount can be selected based on the analysis of word distribution within a text. For example, the electronic device can determine a percentage of a text string length at which a space between words is likely to be found. In some embodiments, the amount by which to decrease can vary based on the previous display attributes (e.g., decrease more or less based on the number of lines over which the text is expected to wrap, or on the total length of the text). In one implementation, the reduction amount can include a default or static reduction amount equal to or about equal to 60% (e.g., in the range of 55% to 65%).

In response to determining that text provided using default display attributes does not fit within a display region, the electronic device can adjust the layout of the text and the font size to attempt to fit within the display region. In particular, the electronic device can define a new text region having a height corresponding to one more line than the previous text region. FIG. 5 is a schematic view of text having different display attributes for display in a display region in accordance with one embodiment of the invention. Content 500 can be selected for display in display region 410 (FIG. 4). The electronic device can determine characteristic dimensions of a display area required to display the text, should the text be displayed in two lines using modified display attributes. In particular, text 521, which can be the same as text 421 (FIG. 4), can be disposed in two lines such that the text wraps between lines in text region 520.

The electronic device can determine or predict expected dimensions for corresponding text region 520 required to display text 521 over two lines using any suitable approach. In some embodiments, the electronic device can define a text region in which the height of the text region has increased to accommodate two lines of text, and in which the width of the text region has decreased due to the extra space provided by the second line. For example, the electronic device can define text region 520 as having width 522 (w2) and height 524 (h2), where w2 is x %*w1, and h2 is 2*x %*h1 (or 2*h1, in other embodiments), with x % defining a reduction amount. By making assumptions about the expected modified display attributes for text 521, should the text region be changed as indicated, the electronic device can avoid applying a word wrap process to text 521 to determine exact characteristic dimensions for text region 520. This can save significant power and processing resources, and enable a device to more rapidly provide a displayed interface without adversely affecting the device performance.

The electronic device can make any suitable assumption to determine the largest possible font size for which text 521 would fit within display region 420 wrapping over two lines. For example, the electronic device can select a font size that is less than the default font size. In particular, the font size of text 521 can be selected to be x % (e.g., the amount by which to decrease the size of text) of the font size of text 421 because the width of the text region was decreased by the same amount. In some embodiments, the resulting font size value can be rounded to the nearest whole or partial font size (e.g., round 12.63 to 12.5, 12, or 13). In some cases, the font size can be rounded down to ensure that the entirety of the text can fit within the text region for which the font size is defined.

The electronic device can repeat this process any suitable number of times, or to any suitable limit. FIG. 6A is a schematic view of text having different display attributes for display in a display region in accordance with one embodiment of the invention. Content 600 can be selected for display in display region 410 (FIG. 4). The electronic device can determine characteristic dimensions of a display area required to display the text, should the text be displayed in three lines using further modified display attributes. In particular, text 621, which can be the same as text 421 (FIG. 4), can be disposed in three lines such that the text wraps between three lines in text region 620.

The electronic device can determine or predict expected dimensions for corresponding text region 620 required to display text 621 over three lines using any suitable approach. In particular, the electronic device can define a text region in which the height of the text region has increased to accommodate three lines of text, and in which the width of the text region has decreased due to the extra space provided by the third line. For example, the electronic device can define text region 620 as having width 622 (w3) and height 624 (h3), where w3 is x %*w2 or (x %)$^2$*w0, and h3 is 3/2*x %*h1 (or 3/2*h1) or 3*(x %)$^2$*h0, with x % defining a reduction amount. More generally, for a text region selected to have N lines of text, with width wN of the text region can be expressed as (x %)$^N$*w0, and the height hN of the text region can be expressed as N*(x %)$^{(N-1)}$*h0.

The electronic device can make any suitable assumption to determine the largest possible font size for which text 621 would fit within display region 420 wrapping over three lines. For example, the electronic device can select a font size that is less than the default font size. In particular, the font size of text 621 can be selected to be x % (e.g., the amount by which to decrease the size of text) of the font size of text 521, or (x %)$^2$ of the font size of text 421, because the width of the text region was decreased by the same amount. Similarly, the font size for text corresponding to a text region having N lines can be selected to be (x %)$^N$ times the font size of text 421. The font size can be rounded using any suitable approach, including one of the approaches described above.

In some embodiments, the electronic device can instead or in addition determine or predict a text region size for text having reduced display attributes, but for which the number of lines with which the text is displayed remains constant. For example, the electronic device can reduce the font size for text 521 while maintaining two lines of text. FIG. 6B is a schematic view of text having different display attributes for display in a display region in accordance with one embodiment of the invention. Content 650 can be selected for display in display region 410 (FIG. 4). Text 671, which can be the same as text 421 (FIG. 4), can be disposed in two lines such that the text wraps between the two lines. Text 671 can have a smaller font size than text 521 (FIG. 5) including, for example, the same font size as text 621. The text region 670 corresponding to text 671 can be defined by width 672 (w3') and height 674 (h3'). To calculate the relationship between width 672 and width 522 (FIG. 5) or width 422 (FIG. 4), or between height 674 and height 524 (FIG. 5) and height 424 (FIG. 4), the electronic device can identify a different reduction amount x'% by which to change the dimensions of text box 670 when an additional line over which to wrap text is not added. For example, w3' can be x'%*w2 or x'%*x %*w0, and h3' can be 3/2 x'%*h2 or 3*x'%*x %*h0.

The electronic device can determine whether to change only display attributes (e.g., change a font size) or to change display attributes and the number of lines over which the text is provided based on any suitable criteria. For example, the electronic device can alternate between changing only display attributes and changing display attributes and the number of lines over which text wraps. As another example, the electronic device can determine whether wrapping text an additional line results in the width of a corresponding text box being substantially different (e.g., substantially smaller) than the previous text box width. As still another example, the electronic device can determine whether decreasing a font size without changing the number of lines results in a text region that is within a reduction amount of the display region associated with the text (e.g., the resulting text region fits closely within the display region, such as within a threshold amount of the width and height of the display region).

The electronic device can perform this regression of text region dimensions (e.g., regression of text region widths and heights) for any suitable number of lines of text. In some embodiments, the electronic device can continue the regression until a limit is reached (e.g., the maximum number of lines can be calculated by the number of pixels within the height of the display divided by the number of pixels required to display the smallest readable font size). Alternatively, the electronic device can perform the regression up to a threshold number of lines (e.g., up to four lines) selected based on the size of the display or application window.

To determine when to stop the regression of display attributes, the electronic device can monitor and compare ratios of the characteristic measurements of each text region over characteristic measurements of the display region. For example, the electronic device can monitor (e.g., calculate and store) values for h0/h1, h0/h2, h0/h3, . . . , h0/hN, w0/w1, w0/w2, w0/w3, . . . , and w0/wN. In particular, for each text region, the electronic device can select the smaller of the height and width ratios (e.g., select the min of hN/h0 and wN/w0). As the text region dimensions change (e.g., as the number of lines in each text region increases), the smaller of the two ratios may initially increase before reaching a maximum value (e.g., the max of the mins) and starting to decrease again. This may be because the ratio of heights will decrease as font size decreases while the ratio of widths will increase as font size decreases.

When the electronic device detects that the smaller of the two ratios first becomes smaller than the smaller of two ratios for a previous text region, display attributes corresponding to the previous text region (e.g., corresponding to the max of the mins) can be used for the text in display region 410. A display attribute module can display the text, using the identified set of display attributes, within the text region using a word wrapping process. The text should then wrap to the number of lines corresponding to the identified display attributes. If the electronic device instead determines that, after reaching a limit for changing display attributes (e.g., changing font sizes) the smaller of the two ratios continues to decrease without reaching a maximum, the electronic device can display the text using one of the approaches described above in connection with FIGS. 3A-3C. For example, the electronic device can use the default display attributes for the text, and add an ellipsis to indicate that additional text is not shown.

FIG. 7 is a table illustrating a variation in text region ratios in accordance with one embodiment of the invention. Table 700 can include column 702 identifying particular display attributes, column 704 of height ratios, column 706 of width ratios, and column 708 of the minimum of columns 704 and 706. Initially, in a one-line configuration with default display attributes, the height ratio can be near 100%, but the width ratio can be substantially less due to the long text. As the text wraps over more and more lines, the height ratio can decrease due to the combined height of several lines, while the width ratio can increase due to the text being placed in more lines. In a two-line configuration, the smaller of the ratios, at 78%, is more than the smaller of the ratios in the one line configuration, at 51%. Accordingly, the electronic device can continue and try a three-line configuration. The smaller of the ratios in the three-line configuration, at 56%, is less than the smaller of the ratios in the two-line configuration, at 78%. Accordingly, the electronic device can conclude that the display attributes corresponding to the two-line configuration are most effective. The electronic device can then identify the display attributes corresponding to the two-line configuration (e.g., a font size equal to (x %)$^n$ times the initial font size for an N-line text box), and apply a word wrap process to the text, using the identified display attributes, to provide the text within the display region (e.g., display region 410, FIG. 4). The resulting display should wrap the text to two lines, as identified by the model. In some embodiments, the electronic device can identify the reduction amount between the initial text region for the text provided using default display attributes and the text region selected by the process, and can use the identified reduction amount to calculate the final display attributes (e.g., the final reduction to the font size).

Figure 8:
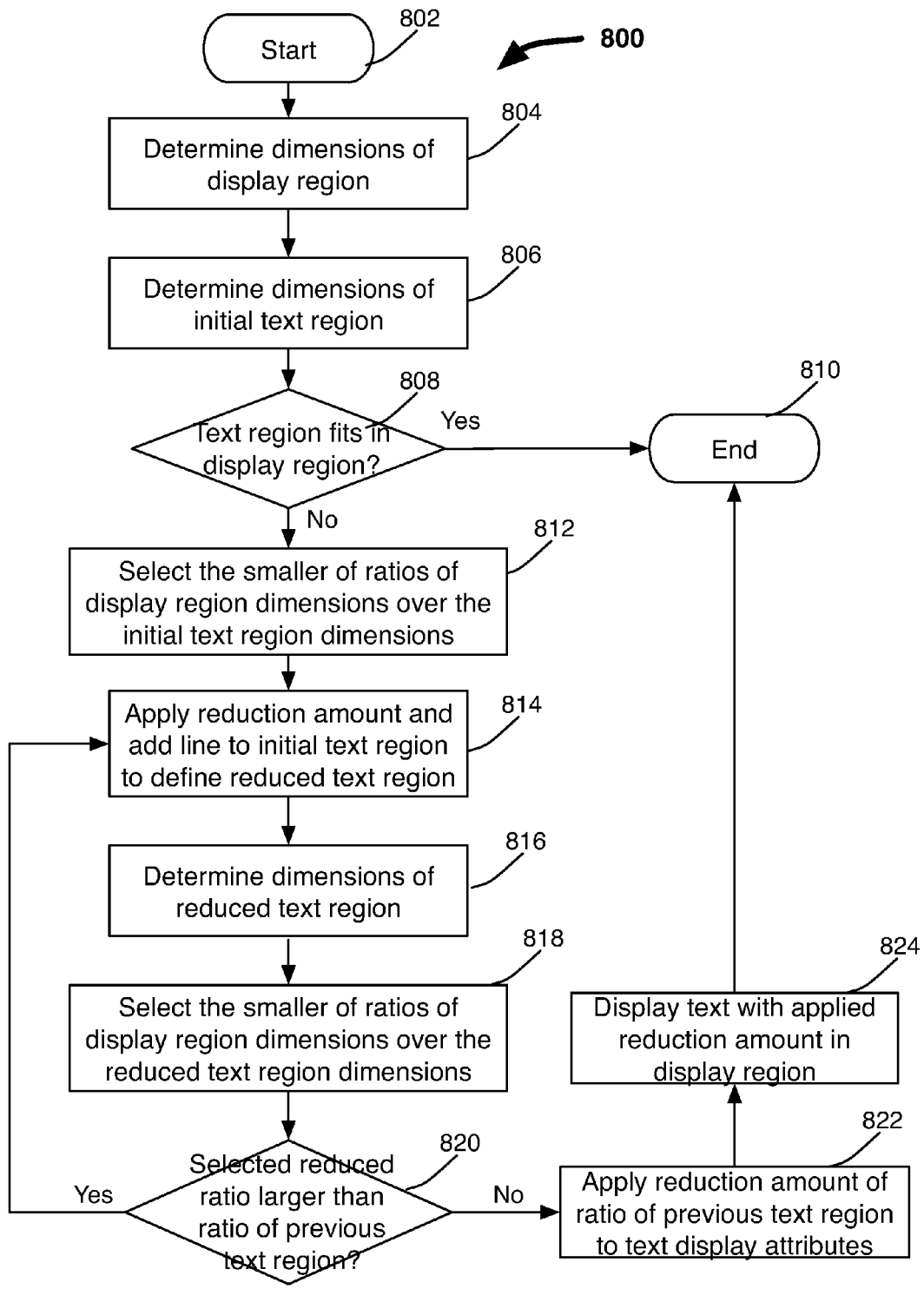
FIG. 8 is a flowchart of an illustrative process for identifying display attributes to use for text displayed in a display region in accordance with one embodiment of the invention.

The following flowcharts will be described in the context of a display module or an electronic device performing steps. It will be understood, however, that one or more electronic device components or modules (e.g., a display module) can instead or in addition perform the process steps. FIG. 8 is a flowchart of an illustrative process for identifying display attributes to use for text displayed in a display region in accordance with one embodiment of the invention. Process 800 can begin at step 802. At step 804, a display module of an electronic device can determine dimensions of a display region in which text can be displayed. For example, the display module can identify characteristic measurements (e.g., height and width) of a display region. At step 806, the display module can determine dimensions of an initial text region. For example, the display module can identify characteristic measurements of a text region necessary to display text using default display attributes. In particular, the display module can determine the dimensions of a text region required to display text using a particular font size on a single line. At step 808, the display module can determine whether the text region fits within the display region. For example, the display module can determine whether one or both of the height and width of the text region are less than the height and width of the display region. If the display module determines that the text region fits within the display region, process 800 can move to step 810 and end.

If, at step 808, the display module instead determines that the text region does not fit within the display region, process 800 can move to step 812. At step 812, the display module can select the smaller of ratios of the display region dimensions over the initial text region dimensions. For example, the display module can select the smallest of ratios of the height and width of the display region over the height and width of the initial text region, respectively. At step 814, the display module can apply a reduction amount to the initial text region, and add an additional line of text to the initial text region to define a reduced text region. For example, the reduced text region can be defined by characteristic measurements calculated by applying a reduction amount to characteristic measurements of the initial display region. The reduction amount can be selected using any suitable approach including, for example, a static value coded based on text analysis.

At step 816, the dimensions of the reduced text region can be determined. For example, the display module can calculate width and height values corresponding to a reduced text region having an additional line of text (e.g., a text region that is less wide, but higher due to the additional line). At step 818, the display module can select the smaller of ratios of the display region dimensions over the reduced text region dimensions. For example, the display module can select the smallest of ratios of the height and width of the display region over the height and width of the initial text region, respectively.

At step 820, the display module can determine whether the selected ratio corresponding to the reduced text region is larger than a ratio corresponding to a previous text region. For example, the display module can determine whether the selected ratio of the reduced display region is larger than the selected ratio of the initial display region. As another example, if several reduced text regions have been defined as a result of repeating steps 814-820, the display module can compare the two most recently defined reduced text regions. If the display module determines that the selected reduced ratio is larger than a ratio corresponding to a previous text region, process 800 can return to step 814, as this can indicate that a maximum ratio value has not yet been identified.

If, at step 820, the display module instead determines that the selected reduced ratio is not larger than a ratio corresponding to a previous text region, process 800 can move to step 822. At step 822, the display module can apply the total reduction amount corresponding to the previous text region to display attributes corresponding to the text. For example, the display module can reduce the font size of the text by an amount corresponding to the total reduction amount (e.g., a function of the reduction amount of step 814). At step 824, the display region can display the text to which the reduced display attributes are applied in the display region. The display module can apply a word wrapping process to the text so that the text wraps within the display region. The number of lines identified by the word wrap process can correspond to the number of lines assumed in the selected reduced text region. Process 800 can then end at step 812.

Figure 9:
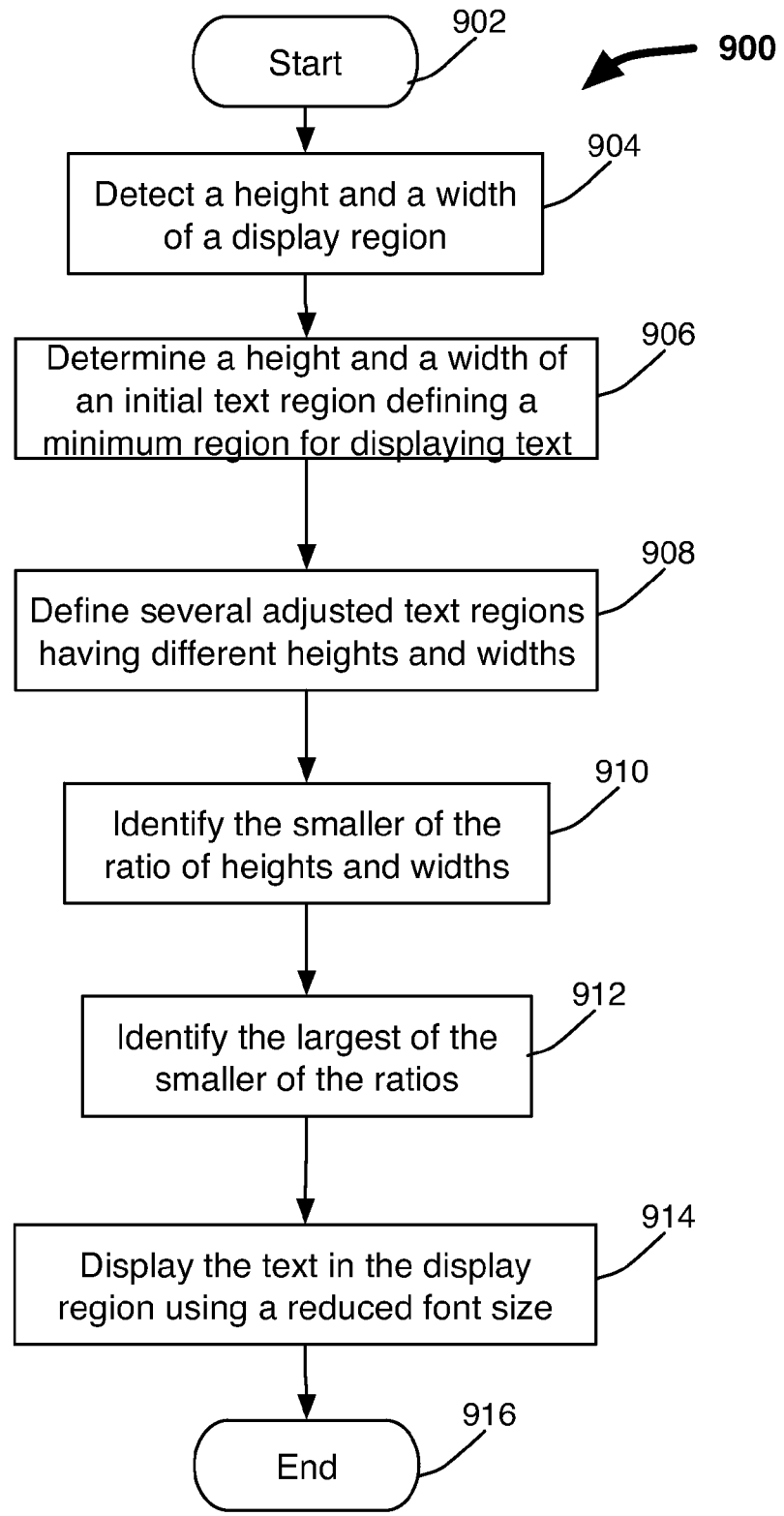
FIG. 9 is a flowchart of an illustrative process for defining a font size for text to be displayed in a display region in accordance with one embodiment of the invention.

FIG. 9 is a flowchart of an illustrative process for defining a font size for text to be displayed in a display region in accordance with one embodiment of the invention. Process 900 can begin at step 902. At step 904, the electronic device can detect a height and width of a display region. For example, the electronic device can determine characteristic dimensions of a region in which text is to be displayed. At step 906, the electronic device can determine a height and a width of an initial text region, where the initial text region defines a minimum region for displaying the text on one line. For example, the electronic device can determine the dimensions of a text box required to display text in a particular font size. At step 908, the electronic device can define several adjusted text regions having different heights and widths. For example, the electronic device can define several text regions for which the height corresponds to an increasing number of lines of text, and for which the width corresponds to a decreasing number of characters per line. The width of a particular adjusted text region can be equal to the width of an adjusted text region (or the initial text region) having one fewer line reduced by a reduction amount (e.g., a fixed percentage).

At step 910, the smaller of the ratio of the initial text region height over the adjusted display region height, and the ratio of the initial text region width over the adjusted display region width can be identified for each of the adjusted display regions. For example, the electronic device can determine, for each adjusted display region, which of the height and width are larger relative to the height and width of the initial display region. At step 912, the largest of the identified smaller of the ratios can be identified. For example, the electronic device can determine which of the ratios corresponds to a maximum. At step 914, the electronic device can display the text in the display region using a reduced font size. The particular amount by which the font size is reduced can correspond to the amount by which the width of the adjusted text region providing the largest radio was reduced relative to the initial text region. Process 900 can end at step 916.

Figure 10:
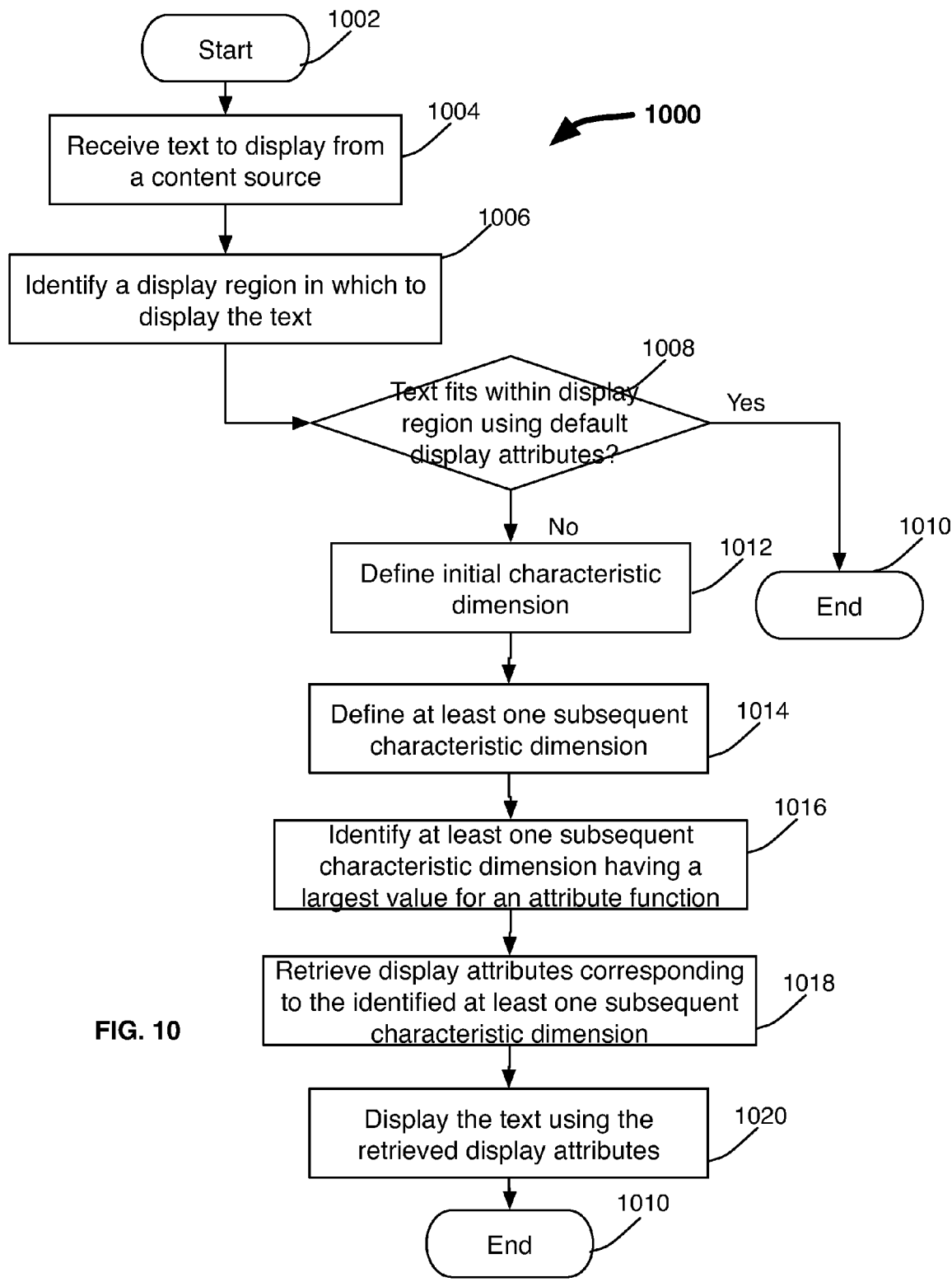
FIG. 10 is a flowchart of an illustrative process for defining display attributes for text to be displayed in a display region in accordance with one embodiment of the invention.

FIG. 10 is a flowchart of an illustrative process for defining display attributes for text to be displayed in a display region in accordance with one embodiment of the invention. Process 1000 can begin at step 1002. At step 1004, an electronic device can receive text to display from a content source. For example, an application or operating system can provide text to display. At step 1004, the electronic device can identify a display region in which to display the text. For example, the electronic device can retrieve length measurements of a display box in which to display the received text. At step 1006, the electronic device can determine whether the text fits in the display region using default display attributes. For example, the electronic device can determine whether the space required for displaying the text on a single line using a default font type and a font size fits within the space available for the display region. If the electronic device determines that the text fits in the display region, process 1000 can move to step 1010 and end.

If, at step 1008, the electronic device instead determines that the text does not fit within the display region, process 1000 can move to step 1012. At step 1012, the electronic device can define an initial characteristic dimension corresponding to a smallest region in which the text can fit in one line using the default display attributes. For example, the electronic device can define a text box for displaying the text using the default display attributes, and identify a width, height or both of the text box. At step 1014, the electronic device can identify at least one subsequent characteristic dimension equal to the initial characteristic dimension reduced by a function of a reduction amount and a number of lines over which to wrap the text. For example, the electronic device can define a subsequent text box characterized by the subsequent characteristic dimension. The subsequent characteristic dimension (e.g., a subsequent width) can be equal to a reduction amount multiplied by the initial characteristic dimension (e.g., the initial width), where the reduction amount corresponds to the number of lines over which the text wraps in the subsequent text box.

At step 1016, the electronic device can identify a subsequent characteristic dimension having a largest value for an attribute function applied to the subsequent characteristic dimension. For example, ratios of the subsequent characteristic dimensions can be compared, and the largest ratio identified. At step 1018, display attributes corresponding to the identified subsequent characteristic dimension can be retrieved. For example, the electronic device can apply a reduction amount corresponding to the identified subsequent characteristic dimension to the default font size to retrieve a reduced font size. At step 1020, the electronic device can display the text in the display region using the retrieved display attributes. For example, the electronic device can display the text using the reduced font size. Process 1000 can end at step 1010.

Figure 11:
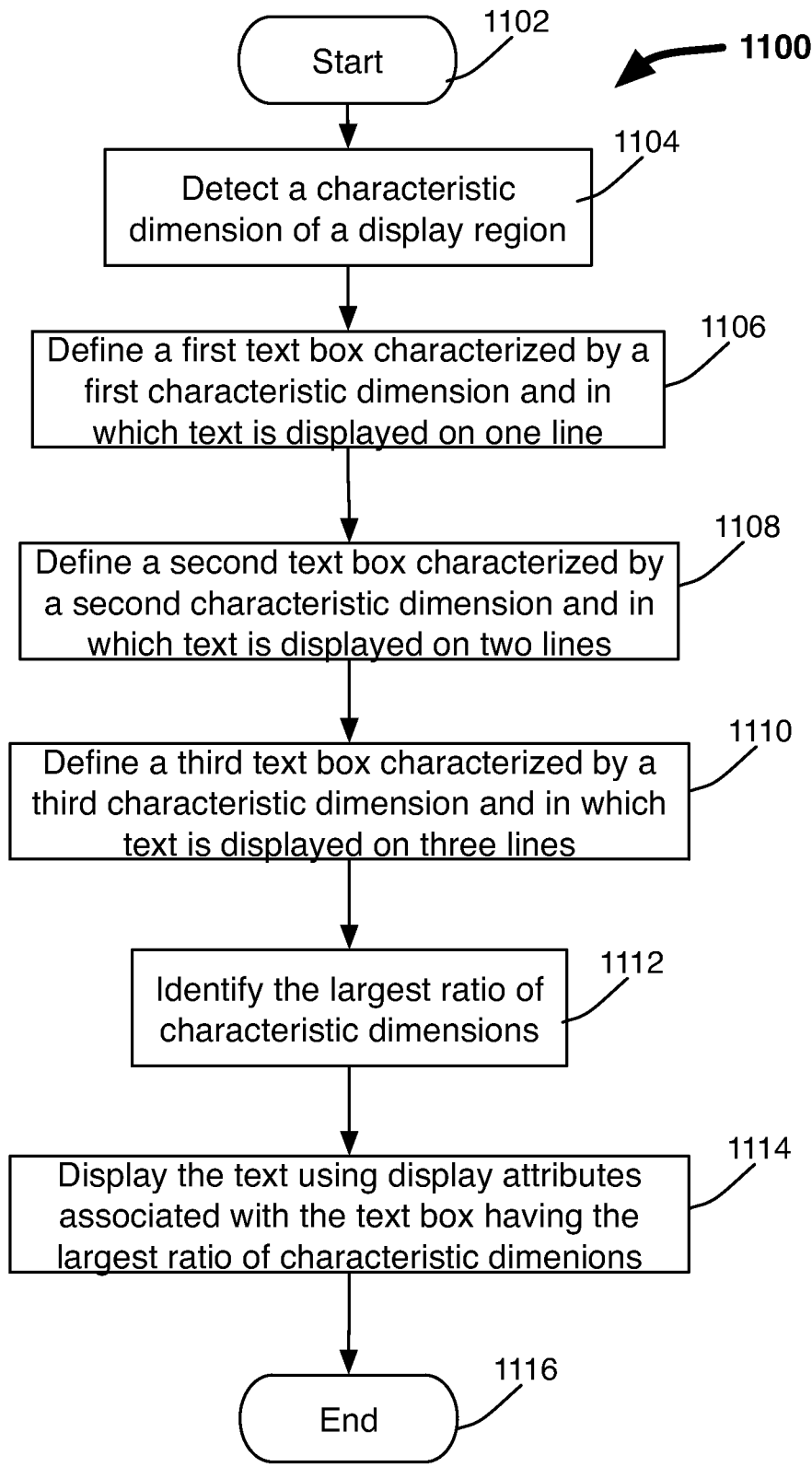
FIG. 11 is a flowchart of an illustrative process for defining display attributes for text to be displayed in a display region in accordance with one embodiment of the invention.

FIG. 11 is a flowchart of an illustrative process for defining display attributes for text to be displayed in a display region in accordance with one embodiment of the invention. Process 1100 can begin at step 1102. At step 1104, the electronic device can detect a characteristic dimension of the display region. For example, the electronic device can detect a characteristic width or height of a display region. At step 1106, the electronic device can define a first text box characterized by a first characteristic dimension, and in which text is displayed on one line. For example, the first text box can have a first width and a first height. At step 1108, the electronic device can define a second text box characterized by a second characteristic dimension, and in which text is displayed on two lines. For example, the second text box can have a second width and a second height. The second characteristic dimension can be equal to the first characteristic dimension reduced by a reduction amount. At step 1110, the electronic device can define a third text box characterized by a third characteristic dimension, and in which text is displayed on three lines. For example, the third text box can have a third width and a third height. The third characteristic dimension can be equal to the second characteristic dimension reduced by the reduction amount.

At step 1112, the electronic device can identify the largest ratio of characteristic dimensions. For example, the electronic device can calculate the ratios of the characteristic dimension of the display region over the first characteristic dimension, the characteristic dimension of the display region over the second characteristic dimension, and the characteristic dimension of the display region over the third characteristic dimension. The electronic device can then identify the largest of those ratios. At step 1114, the electronic device can display, in the display region, the text using display attributes associated with text box having the identified largest ratio of characteristic dimensions. For example, the electronic device can select display attributes that are reduced from default display attributes associated with the first text box by the same amount that the characteristic dimension of the text box is reduced from the first characteristic dimension. Process 1100 can then end at step 1116.

Figure 12:
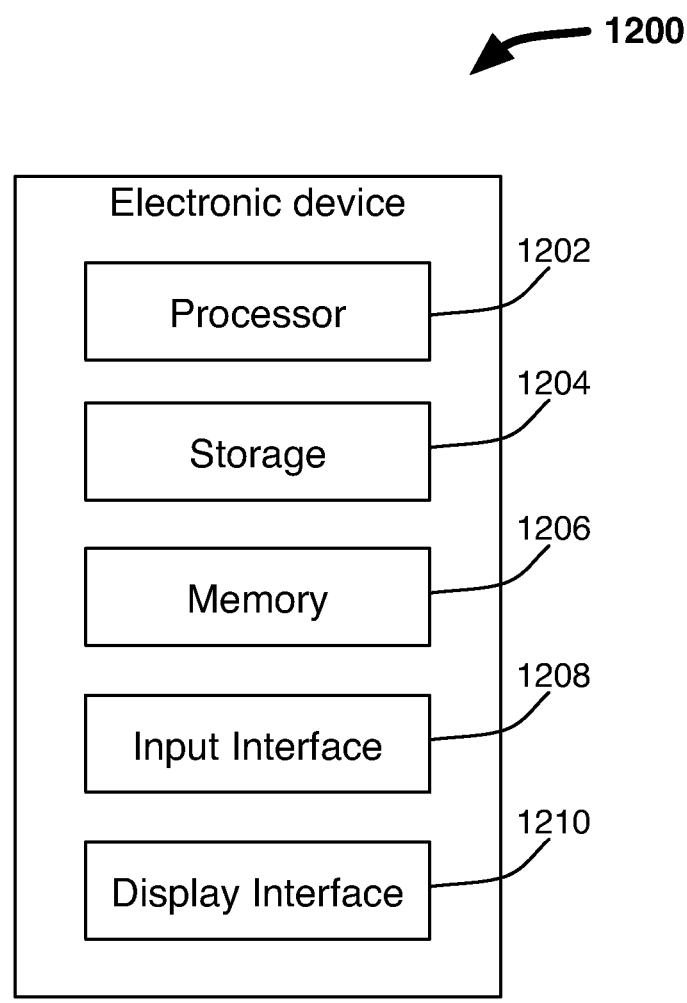
FIG. 12 is a schematic view of an electronic device in accordance with one embodiment of the invention.

Any suitable electronic device can be used to provide some or all of the features described in connection with embodiments of this invention. For example, the electronic device can include cellular telephone, a messaging device, a gaming console, a personal media player, a desktop or notebook computer, a slate, tablet, or pad computing device, a medical device, exercise equipment, or any other electronic device. FIG. 12 is a schematic view of an electronic device in accordance with one embodiment of the invention. Electronic device 1200 may include processor 1202, storage 1204, memory 1206, input interface 1208, and display interface 1210. In some embodiments, one or more of electronic device components 1200 may be combined or omitted (e.g., combine storage 1204 and memory 1206, or omit input interface 1208). In some embodiments, electronic device 1200 may include other components not combined or included in those shown in FIG. 12 (e.g., a power supply, a bus, communications circuitry, or other input or outer interfaces), or several instances of the components shown in FIG. 12. For the sake of simplicity, only one of each of the components is shown in FIG. 12.

Processor 1202 may include any processing or control circuitry operative to control the operations and performance of electronic device 1200. For example, processor 1202 may be used to run operating system applications, firmware applications, media playback applications, media editing applications, or any other application. In some embodiments, a processor may drive a display and process inputs received from a user interface.

Storage 1204 may include, for example, one or more storage mediums including a hard-drive, solid state drive, flash memory, permanent memory such as ROM, any other suitable type of storage component, or any combination thereof. Storage 1204 may store, for example, media data, application data, firmware, user preference information, and any other suitable information or any combination thereof. Memory 1206 can include cache memory, semi-permanent memory such as RAM, and/or one or more different types of memory used for temporarily storing data. In some embodiments, memory 1206 can also be used for storing data used to operate electronic device applications, or any other type of data that may be stored in storage 1204. In some embodiments, memory 1206 and storage 1204 may be combined as a single storage medium.

Input interface 1208 may provide inputs to input/output circuitry of the electronic device. Input interface 1208 may include any suitable input interface, such as for example, a button, keypad, dial, a click wheel, or a touch screen. In some embodiments, electronic device 1200 may include a capacitive sensing mechanism, or a multi-touch capacitive sensing mechanism.

Display interface 1210 can be operatively coupled to processor 1202 for providing visual outputs to a user. Display interface 1210 can include any suitable type of display including, for example, a liquid crystal display (LCD) (e.g., active matrix, passive matrix and the like), a monochrome display, color graphics adapter (CGA) display, enhanced graphics adapter (EGA) display, variable-graphics-array (VGA) display, super VGA display, cathode ray tube (CRT), a plasma display, a display implemented with electronic inks, or any other suitable display. Display interface 1210 can be configured to display a graphical user interface that can provide an easy to use interface between a user of the computer system and the operating system or application running on the system.

In some embodiments, electronic device 1200 may include a bus operative to provide a data transfer path for transferring data to, from, or between control processor 1202, storage 1204, memory 1206, input interface 1208, and display interface 1210, and any other component included in the electronic device.

Although many of the embodiments of the present invention are described herein with respect to personal computing devices, it should be understood that the present invention is not limited to personal computing applications, but is generally applicable to other applications.

The invention is preferably implemented by software, but can also be implemented in hardware or a combination of hardware and software. The invention can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, and optical data storage devices. The computer readable medium can also be distributed over network-coupled computer systems so that the computer readable code is stored and executed in a distributed fashion.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The above-described embodiments of the invention are presented for purposes of illustration and not of limitation.

What is claimed is:

1. A method for selecting a font size for text displayed in a display region, comprising:
    detecting a height and a width of the display region;
    determining a height and a width of an initial text region defining a minimum region required for displaying the text using a default font size;
    defining a plurality of adjusted text regions of different sizes, each adjusted text region comprising a height and a width, wherein:
        the height of each of the plurality of adjusted text regions corresponds to a different number of lines of text within the adjusted text region; and
        the width of each of the plurality of adjusted text regions corresponds to the width of the initial text region reduced by a reduction amount corresponding to the number of lines within the adjusted text region;
    identifying, for each of the plurality of adjusted text regions, the smaller of the ratio of the height of the display region over the height of the adjusted text region and the ratio of the width of the display region over the width of the adjusted text region;
    identifying the one of the plurality of adjusted text regions having the largest of the identified smaller ratios; and
    displaying the text in the display region using a reduced font size corresponding to the default font size reduced by the reduction amount of the identified one of the adjusted text regions.

2. The method of claim 1, further comprising:
    determining that the width of the initial text region is less than the width of the display region; and
    displaying the text in the display region using the default font size.

3. The method of claim 1, wherein:
    the reduction amount is equal to an operation applied to a default reduction amount for which the number of lines within the adjusted text region is a variable.

4. The method of claim 3, wherein the operation further comprises:
    raising the default reduction amount to the power of the number of lines within the adjusted text region.

5. The method of claim 3, wherein:
    the default reduction amount comprises a fixed value.

6. The method of claim 1, wherein displaying further comprises:
    calculating a reduced font size value by reducing the default font size by the reduction amount of the identified one of the adjusted text regions; and
    rounding down the calculated value to use as the reduced font size.

7. The method of claim 1, further comprising:
    applying a word wrap operation on the text having the reduced font size within the display region; and
    verifying that the number of lines to which the text wraps corresponds to the number of lines of the identified one of the adjusted text regions.

8. The method of claim 1, further comprising:
    defining a maximum number of lines for displaying the text; and
    defining no more adjusted text regions than the maximum number of lines.

9. An electronic device for determining a display attribute for displaying text in a display region, comprising:
    a memory;
    a display unit coupled to the memory; and
    one or more processors coupled to the memory and the display and adapted to execute instructions stored in the memory, the instructions adapted to cause the one or more processors to—
    receive text;
    identify a display region having an initial width and height in which to display the text using default display attributes;
    determine that the text does not fit within the identified display region using the default display attributes;
    define an initial characteristic width and height, corresponding to a smallest region in which the text can fit in one line using the default display attributes;
    define at least one subsequent characteristic width and height, each corresponding to a number of lines over which to wrap the text, wherein—
        each subsequent characteristic width has a value equal to the initial width multiplied by a reduction amount raised to a power equal to the subsequent characteristic width's corresponding number of lines, and
        each subsequent characteristic height has a value equal to the initial height multiplied by the subsequent characteristic height's corresponding number of lines multiplied by the reduction amount raised to a power equal to one less than the subsequent height's corresponding number of lines;

identify the at least one subsequent characteristic width and height having a largest value for an attribute function applied to the at least one subsequent characteristic-width and height;

retrieve display attributes corresponding to the identified at least one subsequent characteristic width and height; and display, using the retrieved display attributes, the text on the display unit in a location corresponding to the display region.

10. The electronic device of claim 9, wherein the reduction amount comprises ratios of the initial characteristic width and height over a subsequent characteristic width and height, wherein each ratio comprises like values—width-to-width and height-to-height.

11. The electronic device of claim 9, wherein the memory further comprises instructions adapted to cause the one or more processors to apply a word wrap process to the text using the retrieved display attributes to display the text within the display region.

12. A method for selecting display attributes for text displayed in a display region, comprising:

detecting a characteristic dimension of the display region;

defining a first text box, wherein the text is displayed in the first text box on one line and wherein the first text box is characterized by a first characteristic dimension;

defining a second text box having a different size than the first text box, wherein the text is displayed on two lines in the second text box and wherein the second text box is characterized by a second characteristic dimension equal to the first characteristic dimension reduced by a reduction amount;

defining a third text box having a different size than the first text box and the second text box, wherein the text is displayed on three lines in the third text box and wherein the third text box is characterized by a third characteristic dimension equal to the second characteristic dimension reduced by the reduction amount;

identifying the largest ratio of the characteristic dimension of the display region over the first characteristic dimension, the characteristic dimension of the display region over the second characteristic dimension, and the characteristic dimension of the display region over the third characteristic dimension; and displaying, in the display region, the text using display attributes associated with the one of the first text box, second text box and third text box that corresponds to the characteristic dimension of the identified largest ratio.

13. The method of claim 12, further comprising:

determining that the first characteristic dimension is less than the characteristic dimension of the display region; and displaying the text in the display region using display attributes associated with the first text region in response to determining that the first characteristic dimension is less than the characteristic dimension of the display region.

14. The method of claim 12, further comprising:

identifying at least two characteristic dimensions for each of the display region, first text region, second text region and third text region;

defining at least two ratios of characteristic dimensions for each of the first text region, second text region, and third text region; and selecting the smallest of the at least two ratios of characteristic dimensions for each of the first text region, second text region, and third text region.

15. The method of claim 14, wherein:

the at least two characteristic dimensions comprise a height and a width.

16. The method of claim 15, wherein:

the defined at least two ratios for each of the first text region, second text region, and third text region comprise a ratio of heights and a ratio of widths.

17. The method of claim 15, wherein:

the display attributes comprise a font size; and the font size used for displaying the text comprises a default font size corresponding to the first text box reduced in the same manner as the characteristic dimension of the one of the first text region, second text region, and third text region of the identified largest ratio.

18. A non-transitory program storage device for selecting a font size for text displayed in a display region, the program storage device comprising computer program logic recorded thereon for:

detecting a height and a width of the display region;

determining a height and a width of an initial text region defining a minimum region required for displaying the text using a default font size;

defining a plurality of adjusted text regions of different sizes, each adjusted text region comprising a height and a width, wherein:

the height of each of the plurality of adjusted text regions corresponds to a different number of lines of text within the adjusted text region; and the width of each of the plurality of adjusted text regions corresponds to the width of the initial text region reduced by a reduction amount corresponding to the number of lines within the adjusted text region;

identifying, for each of the plurality of adjusted text regions, the smaller of the ratio of the height of the display region over the height of the adjusted text region and the ratio of the width of the display region over the width of the adjusted text region;

identifying the one of the plurality of adjusted text regions having the largest of the identified smaller ratios; and displaying the text in the display region using a reduced font size corresponding to the default font size reduced by the reduction amount of the identified one of the adjusted text regions.

* * * * *